United States Patent
Meyer et al.

(10) Patent No.: US 7,252,623 B2
(45) Date of Patent: Aug. 7, 2007

(54) METHOD OF USING A PTO CLUTCH FOR AUXILIARY LOAD MEASUREMENT

(75) Inventors: Duane Fredrick Meyer, Hudson, IA (US); Joel Lee Mason, Cedar Falls, IA (US); Daniel Avery Allen, Waterloo, IA (US); Bradley Allen Merrill, Dike, IA (US)

(73) Assignee: Deere & Company, Moline, IL (US)

(*) Notice: Subject to any disclaimer, the term of this patent is extended or adjusted under 35 U.S.C. 154(b) by 206 days.

(21) Appl. No.: 11/196,132

(22) Filed: Aug. 3, 2005

(65) Prior Publication Data

US 2007/0032342 A1    Feb. 8, 2007

(51) Int. Cl.
B60W 10/02    (2006.01)

(52) U.S. Cl. ...................................... 477/176; 477/107

(58) Field of Classification Search ........ 477/174–176, 477/107
See application file for complete search history.

(56) References Cited

U.S. PATENT DOCUMENTS

| | | | | |
|---|---|---|---|---|
| 4,132,133 A | * | 1/1979 | Ballendux | .................... 74/745 |
| 4,542,801 A | * | 9/1985 | Richards et al. | ........... 180/53.1 |
| 5,001,941 A | * | 3/1991 | Nemoto | ..................... 74/15.63 |
| 5,058,455 A | * | 10/1991 | Nemoto et al. | ........... 74/606 R |
| 5,429,005 A | * | 7/1995 | Fukui et al. | .................. 74/325 |
| 6,022,292 A | | 2/2000 | Goodnight | |
| 6,729,459 B2 | | 5/2004 | Reinards et al. | |

* cited by examiner

*Primary Examiner*—Ha Ho

(57) ABSTRACT

A method is provided wherein when an auxiliary device is being powered by the PTO driveline the PTO clutch is periodically slowly ramped down in pressure until slippage is detected in the clutch. Slippage is determined by monitoring the shaft speed into the clutch as well as the shaft speed downstream of the clutch. By determining the commanded pressure where slippage occurred, the equivalent engine power that is going to the auxiliary function is calculated. With this information, the proportion of the engine load signal that is going to the auxiliary function versus the drive wheels is determined. After slip is detected in the PTO clutch, pressure is ramped back up in the clutch so as to minimize the amount of slippage.

2 Claims, 3 Drawing Sheets

METHOD OF USING A PTO CLUTCH FOR AUXILIARY LOAD MEASUREMENT

FIELD OF THE INVENTION

The present invention relates generally to vehicle transmissions. More particularly, the present invention relates to transmissions for work vehicles having a Power-Take-Off (PTO). Specifically, the present invention relates to a method of using a PTO clutch for measurement of auxiliary loads.

BACKGROUND OF THE INVENTION

Conventionally, when shifting gears, many powershift transmissions use solenoid controlled valves to control pressure to each clutch and rely on a signal that is representative of engine load to determine the pressure applied to the on-coming clutches.

A problem that may occur is that the engine load signal may be misleading. For example, in agricultural tractor applications, there are conditions where much of the engine load may be used to power auxiliary functions such as a hydraulic pump or PTO implements. This may cause problems where the shift quality is harsh because the oncoming clutch pressure is commanded at high pressure when instead it should have been commanded low because there was actually only a small amount of the engine power that was going to the drive wheels.

A method of overcoming this problem is described in U.S. Pat. No. 6,022,292. In this reference the load signal from the engine is adjusted to assume that part of the load is going to any auxiliary function that is engaged. The load signal is continuously adjusted automatically based upon the resulting shift characteristics. If the tractor slows down excessively during a shift, it is an indication that the assumption of engine load that is going to the wheels is too low. If the tractor speeds up during a shift, it is an indication that the assumption of engine load that is going to the wheels is too high. The problem with this method is that it can only react to a bad shift. It does not prevent the bad shift from occurring in the first place.

Another problem is that vehicle drivetrains must be designed to handle maximum engine power. However, in some cases some of the engine power is going to auxiliary functions such as PTO implements or hydraulic pumps. In, these cases, it may be desireable to increase engine power because the limiting factor (the drivetrain) is not being loaded to it's capabilities.

A method of determining the power going to the PTO implement is described in U.S. Pat. No. 6,729,459. In this method the PTO clutch pressure is brought down and maintained at a pressure that produces a constant small amount of slip in the clutch. By knowing the commanded pressure that caused slip, the amount of power going through the PTO clutch can be calculated. Besides providing torque measurement, this method also provides a method of protecting the PTO driveline from shock loading. This primary disadvantage of this system is the power loss that is inherent with continuously slipping the clutch.

Accordingly, there is a clear need in the art for a method of determining the amount of engine load going to an auxiliary function that avoids the foregoing problems.

SUMMARY OF THE INVENTION

In view of the foregoing, it is an object of the invention to provide a method for determining the auxiliary load on an engine.

A further object of the invention is to provide such a method that is compatible with known drivetrain systems and operating techniques.

The foregoing and other objects of the invention together with the advantages thereof over the known art which will become apparent from the detailed specification which follows are attained by a method for determining the auxiliary load on an engine of a vehicle equipped with a Power-Take-Off (PTO) for driving an auxiliary function, comprising the steps of: monitoring a shaft speed into a PTO clutch as well as a shaft speed downstream of the PTO clutch to determine clutch slippage; periodically ramping down the PTO clutch in pressure until slippage is detected in the clutch; determining a commanded pressure at the point where slippage occurred; calculating an equivalent engine power that is going to the auxiliary function from the commanded pressure at slippage to determine the proportion of the engine load signal that is going to the auxiliary function versus the drive wheels.

In general, when an auxiliary device is being powered by the PTO driveline the PTO clutch is periodically slowly ramped down in pressure until slippage is detected in the clutch. Slippage is determined by monitoring the shaft speed into the clutch as well as the shaft speed downstream of the clutch. By determining the commanded pressure where slippage occurred, the equivalent engine power that is going to the auxiliary function is calculated. With this information, the proportion of the engine load signal that is going to the auxiliary function versus the drive wheels is determined. After slip is detected in the PTO clutch, pressure is ramped back up in the clutch so as to minimize the amount of slippage.

The primary difference between this method and that described in U.S. Pat. No. 6,729,459 is that the PTO clutch is only periodically brought down in pressure until it slips versus being brought down in pressure to the point where it would be continuously slipping. This is advantageous in that it reduces the power loss that is a result of continuously slipping a clutch.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
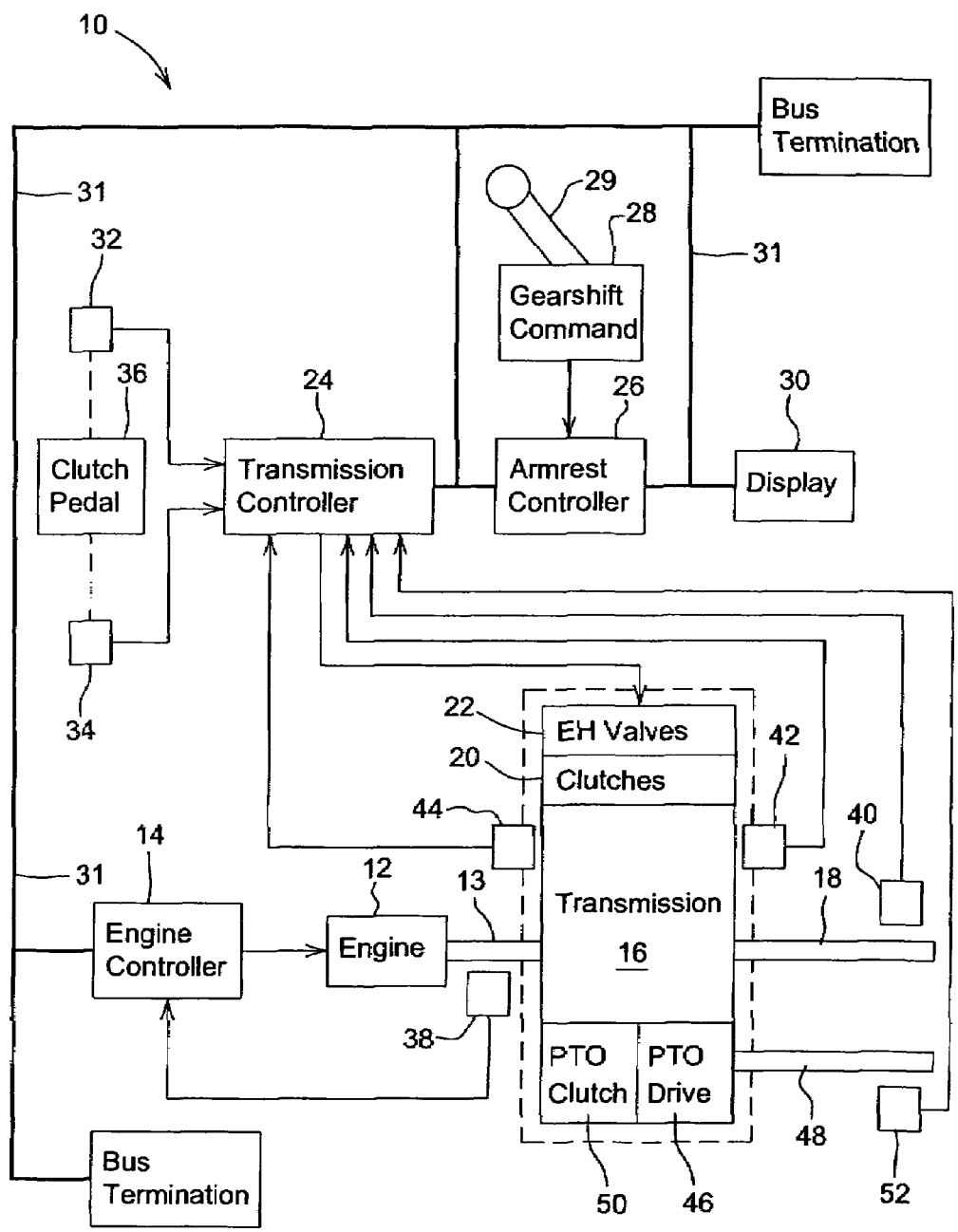
FIG. 1 is a schematic block diagram of a transmission control system according to the present invention.

With reference now to the drawings, and more particularly to FIG. 1, it can be seen that a microprocessor-based transmission control system to which the present invention is applicable is designated generally by the numeral 10. A vehicle power train includes an engine 12 which is controlled by electronic engine control unit 14, and which drives a power shift transmission (PST) 16 via input shaft 13. Transmission 16 has an internal countershaft (not shown), and an output shaft 18 which is connected to drive wheels (not shown). The PST 16 includes a set of pressure operated control elements or clutches 20 which are controlled by a corresponding set of solenoid operated proportional control valves 22. The transmission 16 may be a transmission such as described in U.S. Pat. No. 5,011,465, issued Apr. 30, 1991 to Jeffries et al., and assigned to the assignee of this application. The valves 22 may be two-stage electro-hydraulic valves as described in U.S. Pat. No. 4,741,364, issued May 3, 1988 to Stoss et al. and assigned to applicant's assignee.

The PST 16 is controlled by a transmission control unit 24, an armrest control unit 26 which receives and interprets shift lever commands from shift command lever unit 28. Shift command lever unit 28 is preferably a conventional shift command lever unit used on production John Deere tractors, and includes a gearshift lever 29. Such a shift command lever unit is described in U.S. Pat. No. 5,406,860, issued Apr. 18, 1995 to Easton, et al., and assigned to the assignee of this application. A display unit 30 may display information relating to the system 10. The transmission control unit 24 and the armrest control unit 26 are preferably microprocessor-based electronic control units.

Manual control is achieved via an operator-controlled gearshift command lever unit 28. Unit 28 provide signals representing the position of the lever 29 to the armrest control unit 26. The armrest control unit 26 sends gear command information to transmission control unit 24 via a vehicle communication bus 31.

A clutch engagement sensor 32 and a clutch disengagement switch 34 provide signals representing the position of a clutch pedal 36. The engine control unit 14 receives signals from an engine speed sensor 38, as well as other sensors (not shown) which enable the engine control unit to transmit engine load information on the vehicle communication bus 31. The transmission controller 24 receives signals from an axle speed sensor 40, a counter-shaft speed sensor 42 which senses the speed of an intermediate shaft or counter-shaft which is internal to the transmission 16, and a transmission oil temperature sensor 44. The transmission controller 24 sends wheel speed (calculated from the axle speed based on tire size), and oil temperature information to the display 30 via the vehicle communications bus 31. The intermediate shaft speed information is used only for control purposes and is not displayed under normal operating conditions.

The transmission 16 further includes a PTO drive 46 for driving an auxiliary device or implement (not shown) by way of a PTO output shaft 48. The PTO drive 46 is engaged via a PTO clutch 50. The speed of the PTO output shaft 48 is measured by a PTO speed sensor 52 which communicates with the transmission controller 24.

The transmission control unit 24 includes a commercially available microprocessor which supplies control signals to a set of valve drivers (not shown) which provide variable duty cycle pulse-width-modulated voltage control signals to the valves 22. The transmission control unit 24 generates control signals as a function of various sensed and operator determined inputs in order to achieve a desired pressure in the clutches and to thereby control the shifting of the transmission 16 in a desired manner.

The transmission controller 24 executes a known production main loop algorithm (not shown) which controls the time varying hydraulic pressures which are applied to the various transmission clutch elements. In accordance with the present invention, the controller also executes an algorithm represented by FIGS. 2 and 3. The conversion of the flow charts of FIGS. 2 and 3 into a standard language for implementing the algorithm described by the flow chart in a digital computer or microprocessor, will be evident to one with ordinary skill in the art.

Figure 2:
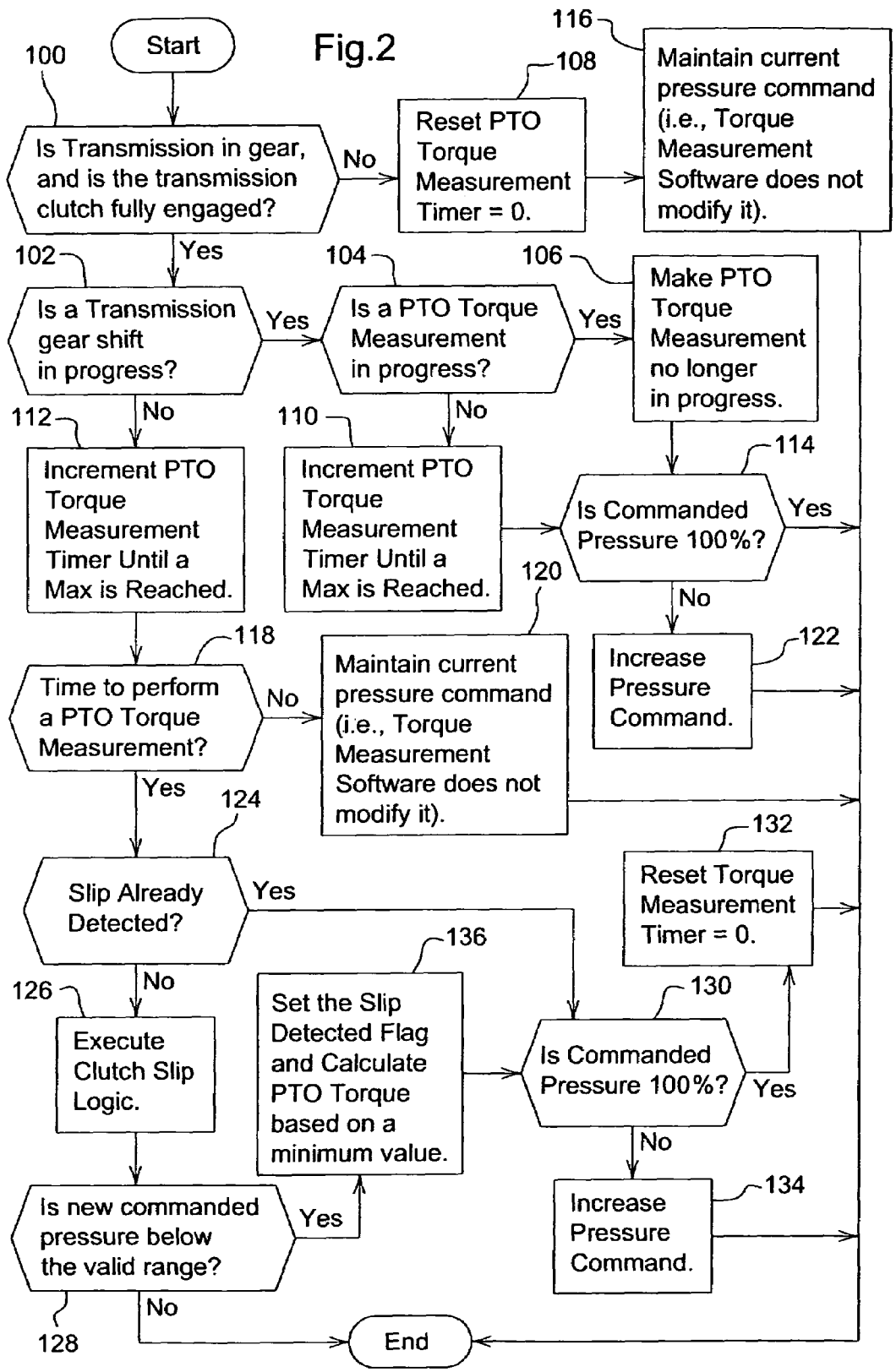
FIG. 2 is a logic flow diagram illustrating an algorithm executed by the transmission controller of FIG. 1; and, FIG. 3 is a logic flow diagram illustrating an algorithm represented by step 126 of FIG. 2.

FIG. 2 illustrates how the method is executed in a microcomputer based control system. The sequence from Start to End in FIG. 2 is executed by a task manager type of a real time operating system at some periodic interval running in the transmission controller. The scope of the invention does not include the normal engagement strategy of the PTO. At the start of this algorithm, it is assumed that the PTO has been turned on and is fully engaged. If the PTO is not turned on and fully engaged, the algorithms of the invention do not run. The result of this logic at the End is a PTO commanded pressure in kPa. The downstream processes that apply this commanded pressure electronically to the PTO Clutch via the EH PTO Valve and other factors which might influence the final commanded pressure are not within the scope of the invention.

In FIG. 2 at 100 it can be seen that the first step in the PTO Torque Measurement process is to determine if the transmission clutch is fully engaged and the transmission is in gear. If this criterion is not met, the PTO Torque Measurement will be disabled by resetting the PTO Torque Measurement Timer at 108 (referred to simply as "timer" in the description that follows) and at 116 the commanded pressure will remain unchanged. The timer then provides an initial time delay to the first torque measurement in the event that the transmission clutch becomes fully engaged and the transmission fully shifts into a gear.

At 102 the second criteria for a PTO Torque Measurement attempt is checked to see if a transmission shift is in progress. If so, then the PTO Torque Measurement will either not begin, in which case at 112 the timer is simply incremented and the commanded pressure maintained at 100%, or in the event that a PTO Torque Measurement is in progress at the time of the shift as at 104, the current torque measurement will be aborted as shown at 106 and the commanded pressure will be ramped back up to full pressure at 122, if the commanded pressure is less than 100% of full pressure as at 114 at the time the shift is initiated.

If a transmission shift is not in progress, then the timer is incremented and limited to prevent overflow at 110 and checked to see if a new PTO Torque Measurement should be taken at 118. If it is not time to start a PTO Torque Measurement, the commanded pressure is not changed. If it is time to start a new PTO Torque Measurement, clutch slip is checked at 124 before clutch slip logic is executed at 126. If slip has been detected, then pressure is ramped back up to 100% and the timer is reset for the next measurement cycle. If slip has not been detected, then the clutch slip logic is executed.

The output of the clutch slip logic is a commanded pressure to the PTO clutch while the algorithm is running. When slip is detected, the PTO Torque is calculated as a function of the pressure command at which slip was detected. The pressure is then ramped back up to full pressure at 130, 134 and the timer reset for the next measurement attempt.

Figure 3:
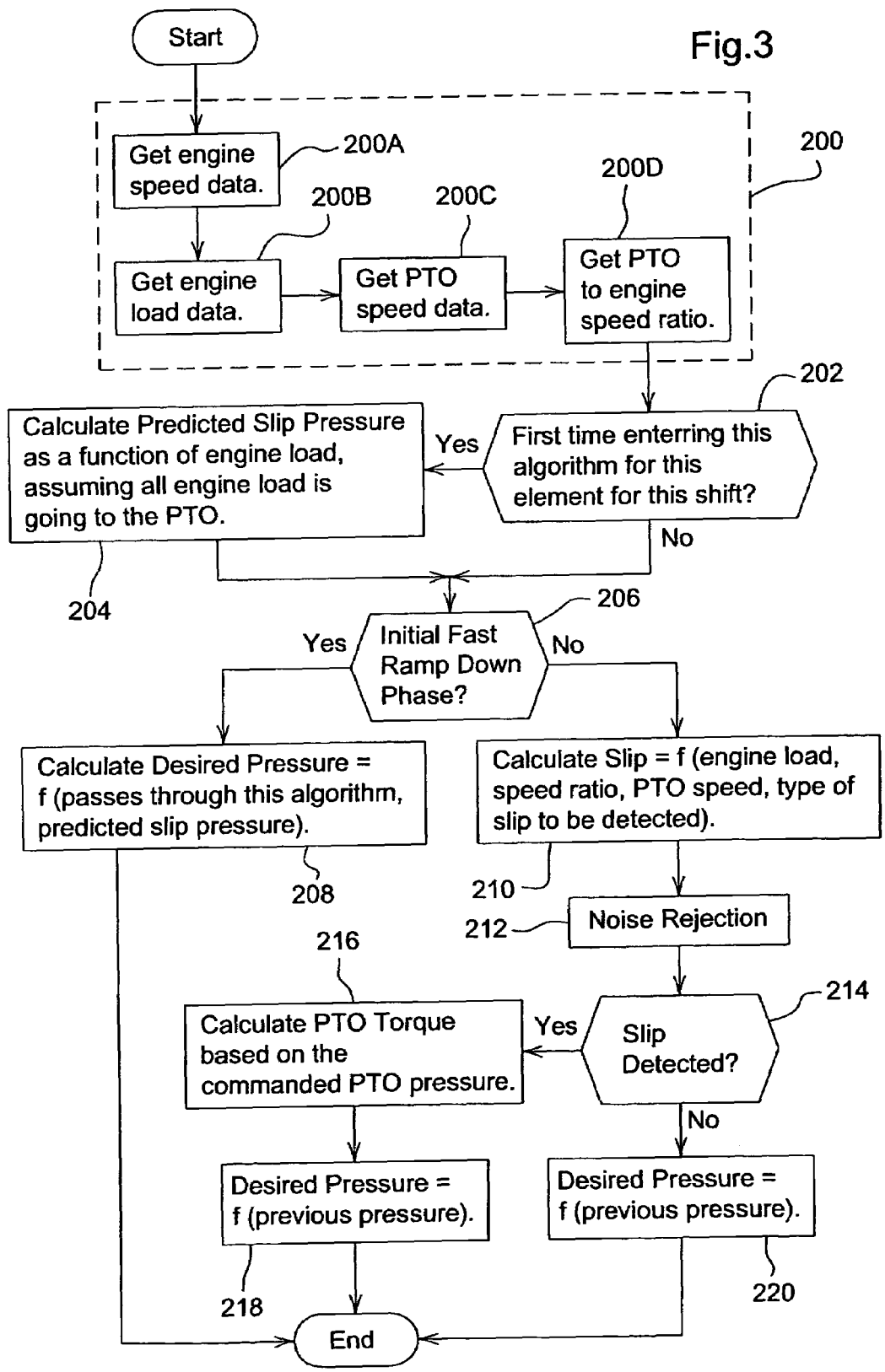

The details of the clutch slip logic of block 126 of FIG. 2 are now discussed with reference to FIG. 3. The first step 200 in the clutch slip logic is to obtain current data on engine speed 200A, engine load (i.e. brake torque) 200B, PTO shaft speed 200C, and the PTO to engine speed ratio 200D. If at 202 it is the first pass through the software routine for the clutch element, then a predicted slip pressure is calculated based on the engine load at 204, assuming that all the engine load is going to the PTO. The equation that relates the amount of engine torque going through the transmission to the slip pressure is the following:

$$\text{Engine torque(Nm)} = \text{slip pressure(kPa)} * m + b$$

The slope m and the intercept b are found empirically. A predicted slip pressure can be calculated by using the above equation, solving for slip pressure. The equation is as follows:

$$\text{Predicted slip pressure(kPa)} = (\text{engine torque} - b)/m$$

In this algorithm, the empirically found intercept b is made relative to the value of the calibrated fill pressure for the PTO clutch element by subtracting the product of the calibrated fill pressure and slope m. Thus, the equation developed from a set of experimental data can be applied to all vehicles to which the invention applies.

Each time the algorithm is executed, a decision is made at 206 to determine if the algorithm is in the fast ramp down phase. The PTO clutch has a loop counter associated with it in software that indicates the number of passes through the clutch slip function since the torque measurement started. The decision of whether or not the algorithm should execute the fast ramp down phase or proceed to the gradual ramp down phase is based solely on the value of this loop counter. If the Loop Counter is less than some value, 6 for example, the algorithm executes a fast ramp down in pressure on the clutch. The predicted slip-pressure mentioned above, sets the target pressure for the initial fast ramp down software at 208. An example equation that might be used to calculate the commanded pressure output during this fast ramp down phase is:

$$\text{Commanded Pressure} = \text{Previous Pressure Output} - (\text{Target Change} * 2/3)$$

In the above equation, the Target Change is the difference between the Previous Pressure Output and predicted slip pressure mentioned above, where the previous pressure output is initialized to full system pressure. Another approach would be to base the pressure output on a lookup table. An example might be:

| Pressure Output | Loop Counter |
|---|---|
| Predicted Slip Pressure + Offset | 1 |
| Predicted Slip Pressure + Offset | 2 |
| Predicted Slip Pressure + Offset | 3 |
| System Pressure | 4 |
| System Pressure | 5 |
| Predicted Slip Pressure + Offset | 6 |

The intent of the fast ramp down phase is to decrease pressure on the PTO clutch rapidly to a pressure that is slightly above where the engine load signal indicates the clutch element will just begin to slip, if the entire engine load is going to the PTO. This method is used simply in an effort to minimize the algorithm's overall execution time. The profile of the pressure command during the fast ramp down phase is determined empirically to minimize pressure undershoot.

Once this pressure is reached, the algorithm moves on to the gradual pressure ramp down phase at 210. During this phase, the pressure command is reduced gradually, by a fixed amount each time through the routine, 2 kPa for example, while the software attempts to detect slip in the PTO clutch. Slip is defined as relative motion between the PTO clutch plates. Slip Ratio is calculated as follows:

$$\text{Slip Ratio} = (\text{PTO shaft speed} * \text{PTO gear ratio})/\text{engine speed}$$

In this algorithm, the slip ratio is calculated with a precision of 0.1%.

The slip ratio is passed through a noise rejection algorithm at 212 that consists of an N/(N+1) digital average filter and additional logic. Actual slip is calculated based on the filtered value of the slip ratio. If negative slip is being detected, a slip ratio of 0.980 would correspond to an actual slip of 2.0%. If positive slip is being detected, a slip ratio of 1.020 would correspond to an actual slip of 2.0%. The additional logic consists of checking the direction of the slip (positive or negative) and comparing the current slip measurement with the value from the previous pass through the algorithm. Valid slip detection is made at 214 if the current slip is greater in magnitude than the previous value of slip, in the same direction, and is greater than some threshold. Furthermore, a control parameter exists in memory for each clutch element to set how many of these valid slip events must be seen before slip is detected. In practice, it has been found that the following parameters are effective for the PTO clutch:

N=3

Required Valid Slip Events=1

Slip Detection Threshold=2.0%

For PTO Torque Measurement, negative slip is the desired detection option. If slip is not detected at 214, then a fixed amount of pressure is subtracted from the previous pressure command and this becomes the new desired pressure at 218. If slip is detected at 214, then at 216 the pressure command is processed back through the linear equation above to produce a calculated PTO Torque, and the commanded pressure remains unchanged at 220. This calculated PTO Torque is then made available in software for other processes that can benefit from it, transmission shift algorithms for example. A flag in software is also available that indicates when the slip is detected and the torque calculation is made. This flag is used by parent processes in order to effectively take back control of the commanded pressure (i.e. in order to know when to ramp pressure back up on the PTO clutch), as would be the case in the "YES" path of block 124 in FIG. 2.

A downstream process that is always executed after the clutch slip logic is a boundary check on the commanded pressure that is output from the clutch slip logic. If the commanded pressure is reduced to a minimum value without clutch slip being detected, then the parent process described in FIG. 2 will set the slip detected flag and calculate the PTO Torque from that minimum pressure value at 136. Then, the pressure would be ramped back up to 100%, etc.

Those having skill in the art will now recognize that by knowing how much of the engine power is going to the drive train and how much is going to auxiliary loads it is possible to improve Powershift transmission shift quality during conditions of auxiliary load such as PTO implements. Further, the transmission clutch pressure used during the shift can be matched to handle only the engine load that is going to the drive wheels. Additionally, engine power can be increased without compromising drive train life (when part of the engine power is going to the auxiliary load).

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A method for determining the auxiliary load on an engine of a vehicle equipped with a Power-Take-Off (PTO) for driving an auxiliary function comprising the steps of:
    monitoring a shaft speed into a PTO clutch as well as a shaft speed downstream of the PTO clutch to determine clutch slippage;
    periodically ramping down the PTO clutch in pressure until slippage is detected in the clutch;
    determining a commanded pressure at the point where slippage occurred;
    calculating an equivalent engine power that is going to the auxiliary function from the commanded pressure at slippage to determine a proportion of the engine load signal that is going to the auxiliary function versus the drive wheels.

2. A method for determining the auxiliary load on an engine as set forth in claim 1 comprising the further step of ramping the PTO clutch pressure back up after slippage is detected to minimize clutch slippage.

* * * * *